US010212467B1

(12) United States Patent
Archer, III et al.

(10) Patent No.: US 10,212,467 B1
(45) Date of Patent: Feb. 19, 2019

(54) METHOD AND APPARATUS FOR STREAMING VIDEO

(71) Applicant: AT&T Intellectual Property I, L.P., Atlanta, GA (US)

(72) Inventors: Virgil L. Archer, III, Los Angeles, CA (US); Michael Depies, El Segundo, CA (US); Mathew Goldade, Los Angeles, CA (US); Grant Hafer, Manhattan Beach, CA (US); Maxwell Shteir-Dunn, Santa Monica, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/925,264

(22) Filed: Mar. 19, 2018

(51) Int. Cl.
| | |
|---|---|
| *H04W 8/18* | (2009.01) |
| *G06F 17/30* | (2006.01) |
| *H04H 60/46* | (2008.01) |
| *H04L 29/08* | (2006.01) |
| *H04N 21/45* | (2011.01) |
| *H04N 21/254* | (2011.01) |
| *H04N 21/258* | (2011.01) |
| *H04N 21/262* | (2011.01) |
| *H04N 21/458* | (2011.01) |

(52) U.S. Cl.
CPC ......... *H04N 21/262* (2013.01); *H04N 21/254* (2013.01); *H04N 21/25891* (2013.01); *H04N 21/458* (2013.01); *H04N 21/4532* (2013.01); *G06F 17/30843* (2013.01); *H04H 60/46* (2013.01); *H04L 29/08936* (2013.01); *H04W 8/18* (2013.01)

(58) Field of Classification Search
None
See application file for complete search history.

(56) References Cited

U.S. PATENT DOCUMENTS

| | | | |
|---|---|---|---|
| 6,088,722 | A | 7/2000 | Herz et al. |
| 7,392,532 | B2 | 6/2008 | White et al. |
| 7,665,035 | B2 | 2/2010 | Burnett |
| 8,015,580 | B2 | 9/2011 | Poling, Jr. et al. |
| 8,255,953 | B1 | 8/2012 | Rowson et al. |
| 8,782,698 | B2 | 7/2014 | Gossweiler et al. |

(Continued)

FOREIGN PATENT DOCUMENTS

EP   1667452 B1   11/2011

OTHER PUBLICATIONS

Abell, John C., "Google Unveils Personalized Channels' to Bridge TV Attention Gap", wired.com, Dec. 1, 2010, 3 pages.

*Primary Examiner* — James R Marandi
(74) *Attorney, Agent, or Firm* — Guntin & Gust, PLC; Jay Anderson (57) ABSTRACT

Aspects of the subject disclosure may include, for example, a method of preparing and presenting a customized media channel, including receiving user preferences of a first user; receiving data plan information applicable to a first device utilized by the first user; receiving consumption information of the first user; scheduling media content on a first channel customized for the first user, by arranging the media content based on the user preferences of the first user and the consumption information of the first user; and providing the first channel to the first device at a first bit rate that varies according to the data plan information. Other embodiments are disclosed.

17 Claims, 8 Drawing Sheets

(56) References Cited

U.S. PATENT DOCUMENTS

| | | |
|---|---|---|
| 8,793,729 B2 | 7/2014 | Adimatyam et al. |
| 8,855,598 B2 * | 10/2014 | Bedingfield, Sr. ........................... H04L 12/1417 455/406 |
| 9,027,057 B2 | 5/2015 | Roberts et al. |
| 9,055,255 B2 | 6/2015 | Burdzinski et al. |
| 9,118,965 B1 | 8/2015 | Gravino et al. |
| 9,414,108 B2 | 8/2016 | Sirpal et al. |
| 9,462,346 B2 | 10/2016 | Snyder et al. |
| 9,526,004 B2 * | 12/2016 | Chaput ................. H04M 15/67 |
| 9,544,195 B1 * | 1/2017 | Garg .................... H04L 47/627 |
| 9,712,884 B2 | 7/2017 | Grouf et al. |
| 9,774,648 B2 * | 9/2017 | Abuelsaad .............. H04L 65/60 |
| 9,788,036 B2 | 10/2017 | Garcia Navarro et al. |
| 9,832,043 B2 * | 11/2017 | Okamoto ............ H04L 12/5692 |
| 9,860,294 B2 * | 1/2018 | Rehan ................... H04L 65/604 |
| 2011/0239253 A1 | 9/2011 | West et al. |
| 2013/0122854 A1 * | 5/2013 | Agarwal ............... H04L 12/141 455/405 |
| 2013/0291018 A1 | 10/2013 | Billings et al. |
| 2014/0082645 A1 * | 3/2014 | Stern ................ H04N 21/26258 725/13 |
| 2014/0189056 A1 * | 7/2014 | St. Clair ............... H04L 67/303 709/217 |
| 2016/0044356 A1 | 2/2016 | Eatedali et al. |
| 2016/0080793 A1 * | 3/2016 | Ruffini ............... H04N 21/2668 725/34 |
| 2016/0080807 A1 * | 3/2016 | Trimper ............... H04N 21/458 725/30 |
| 2016/0142783 A1 | 5/2016 | Bagga et al. |
| 2016/0192296 A1 * | 6/2016 | Rehan ................... H04L 65/604 455/574 |
| 2017/0339444 A1 | 11/2017 | Shaw et al. |

* cited by examiner

METHOD AND APPARATUS FOR STREAMING VIDEO

FIELD OF THE DISCLOSURE

The subject disclosure relates to a customized streaming video and in particular a method and apparatus for streaming video.

BACKGROUND

Streaming video, generally, is becoming common place. Users are able to log in to a source, and select from a variety of media content offered by that source. However, such systems can be improved.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for creating and presenting one or more customized channels, according to user profiles, user preferences, actual user consumption, data plans, and data utilization. Other embodiments are described in the subject disclosure.

One or more aspects of the subject disclosure include a method comprising: obtaining, user preferences, data plan information, and consumption information for a first; scheduling media content on a channel customized for the user, by arranging the media content based on the user preferences and consumption information; and providing access to the channel at a bit rate that varies according to the data plan information.

One or more aspects of the subject disclosure include storage medium with executable instructions that, when executed by a processing system, facilitate: receiving user preferences, data plan information, and consumption information of a user; scheduling media content on a channel customized for the user, by arranging the media content based on the user preferences and the consumption information; and providing the channel at a bit rate that varies according to the data plan information.

One or more aspects of the subject disclosure include a system having a processor and a memory that stores executable instructions that, when executed by the processor, facilitate obtaining user preferences and data plan information applicable to a user; obtaining access to media content from a plurality of sources; scheduling the media content on a channel customized for the user, by arranging the media content based on the user preferences; and providing the channel to the user at a bit rate that varies according to the data plan information.

Figure 1:
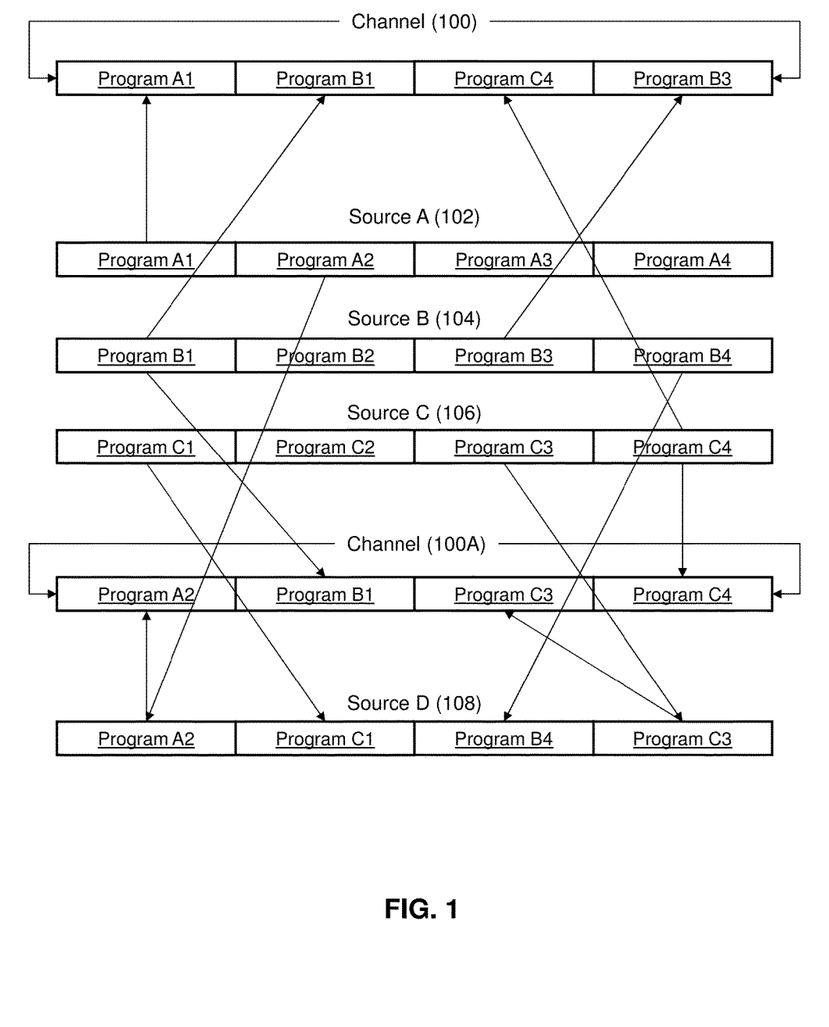
FIG. 1 depicts an illustrative embodiment of a channel customized from a plurality of sources.

FIG. 1 depicts an illustrative embodiment of a customized media channel 100 assembled from a variety of sources 102, 104, 106, and 108. As shown, and discussed in greater detail below, the disclosed embodiments seek to create a customized media channel 100, by assembling media content, or programs, from multiple sources 102-108. The media content include live television, radio, and/or other broadcasts, such as news broadcasts and sporting events. The media content may also include prerecorded programming, such as videos, films, movies, and/or even locally (or remotely) recorded live broadcasts.

The sources 102-108 can likewise vary. For example, Source A 102 may represent a local television station broadcasting over the air. Source B 104 may represent a cable or satellite provider. Source C 106 can represent an internet based source, such as Netflix, Hulu, etc. Source D 108 can represent a local source, such as a DVR, gaming console, video/audio juke box, or some other media source. It can be seen that Source D 108 itself collects media content from a variety of sources, and makes them available for use with the channel 100. Any of the sources 102-108 may be integrated into other sources, or other components of the disclosed embodiments, as will be discussed further below. Of course, the disclosed embodiments may utilize any combination of these or other sources of media content.

In the example depicted, the channel 100 is assembled by presenting Program A1, from Source A 102, in its regularly scheduled time slot. The channel 100 is further assembled by presenting Programs B1 and B3, from Source B 104, in delayed time slots. The channel 100 is further assembled by presenting Program C4, from Source C 106, in an advanced time slot. This may be possible where Source C 106 makes its programming available beforehand and/or where Source C 106 simply provides its media content without specific scheduling, such as in the case of an internet based source or a local source, like a DVR for example.

Also depicted is customized channel 100A, which may be a completely separate channel from channel 100, or may simply be channel 100 as presented after refinement, during a different time segment, and/or on a different day. In this manner, the disclosed embodiments seek to present one or more media channels 100/100A customized specifically for a user, or users, based on information about the user(s) and available media content, which may come from a variety of sources.

Figure 2:
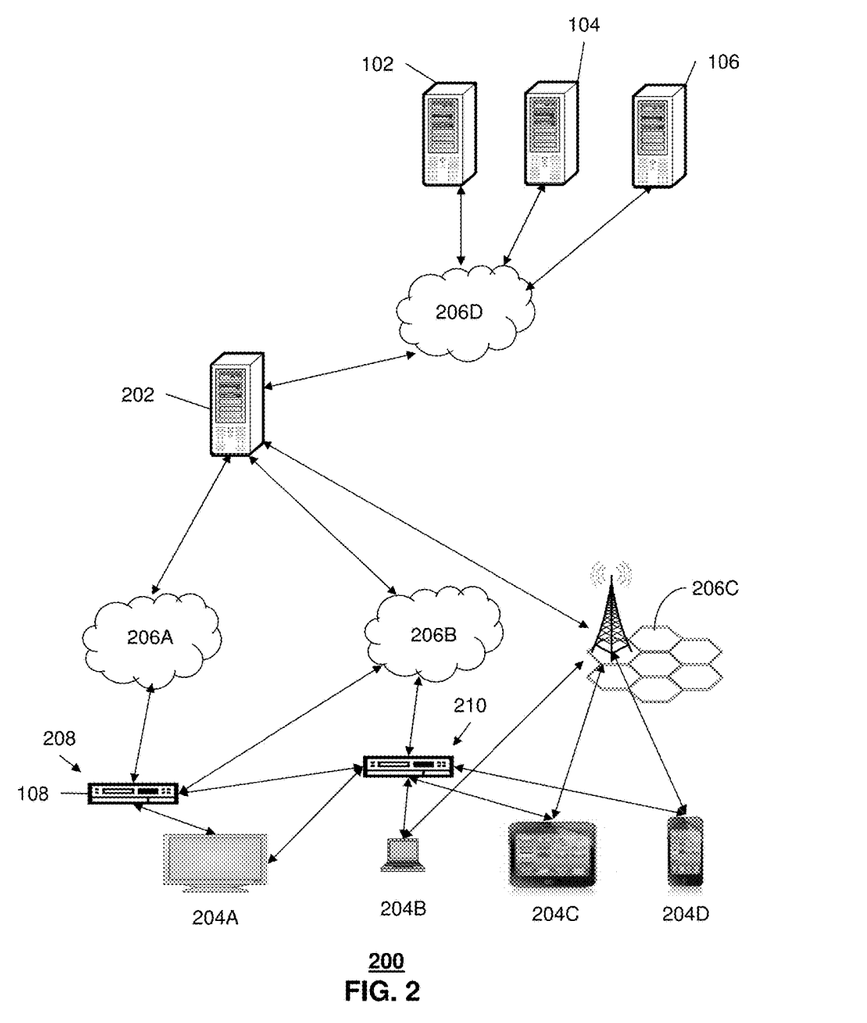
FIG. 2 depicts an illustrative embodiment of a system or environment to support streaming of the customized channel of FIG. 1.

FIG. 2 depicts an illustrative embodiment of an environment 200, in which the disclosed embodiments can operate. The disclosed embodiments preferably include a processing system 202, which may include one or more processors and memory for executing instructions. The processing system 202, which we will refer to as an aggregator 202, may connect to one or more user devices, such as a television 204A, a computer 204B, a tablet, 204C, and/or a mobile smartphone 204D, through one or more networks, such as a broadcast network (not shown), an access restricted network 206A (such as a cable or satellite network), an open network 206B (such as the Internet), and/or another network 206C (such as cellular network). The aggregator 202 may also communication with the sources 102-108 through any combination of these, and/or another network 206D.

The aggregator 202 may communicate through one or more intermediate devices, such as a set-top-box (STB) 208 and/or local network hardware, such as a router 210. The STB 208 and/or the local network hardware may include a local media source, such as a DVR, or Source D 108. The aggregator 202 may communicate with the user device(s) and/or sources through any combination of these or other networks and intermediate devices.

Figure 3:
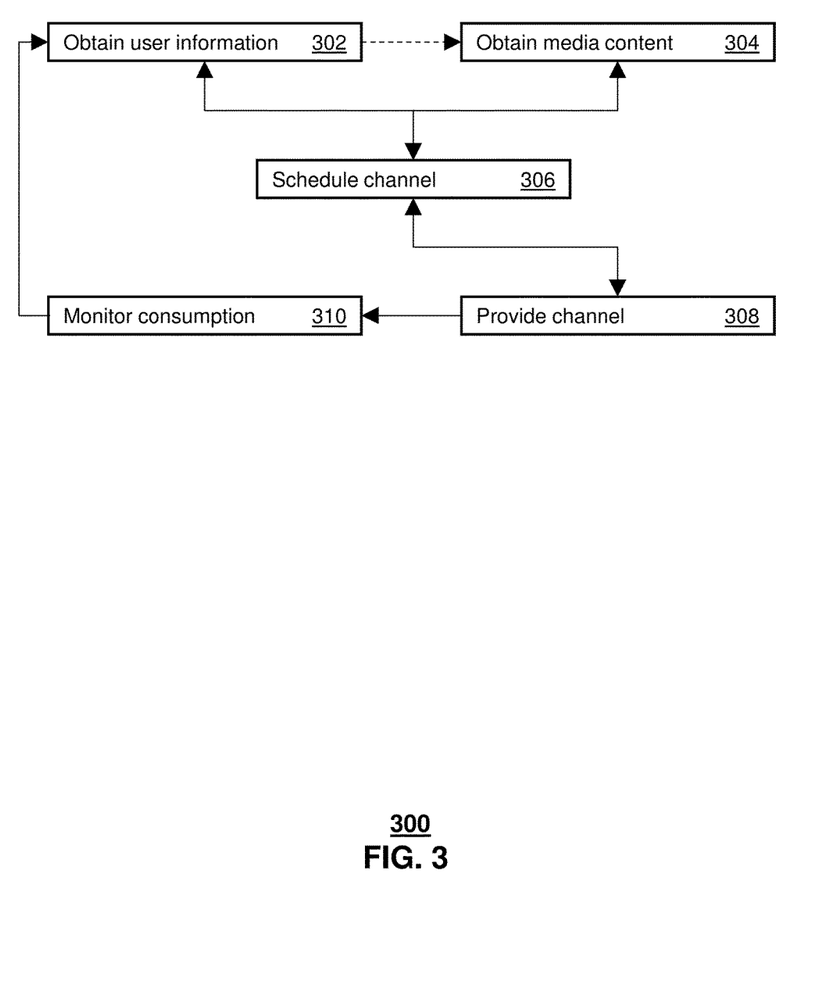
FIG. 3 depicts an illustrative embodiment of a method used in portions of the system described in FIG. 2.

FIG. 3 depicts an illustrative embodiment of a method used by the disclosed embodiments; and while for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

The aggregator 202 of the disclosed embodiments preferably gathers information related to the user, as shown in step 302. This information may include user preferences, such as what types of media the user or users are interested in, and when. This user preference information may include user consumption data, or such data may be provided separately. This information may include an indication of devices the user, or users, will use to access the media.

The user preferences may include information such as what types of media content the user enjoys, and when. For example, the user preferences may indicate that the user enjoys watching particular sport(s), or particular team(s), or that the user prefers listening to a particular type of music. The user preferences may indicate that the user prefers certain channels and/or certain programs.

The user preferences may also include temporal information. For example, the user preferences may indicate that the user enjoys watching news at a certain time on certain days, but at other times (or not at all) on other days. More specifically, the user preferences may indicate that the user enjoys watching the 5 o'clock news at 5 PM on Mondays and Wednesdays, but prefers watching the 5 o'clock news at 6 PM on Tuesdays and Thursdays, at 4 PM on Friday, and not at all on Saturdays and Sundays.

The aggregator 202 may also gather information related to the user's actual consumption of the media content. For example, rather than requiring the user to specify their media consumption preferences, the disclosed embodiments may simply monitor various devices of the user to discern the user's actual media consumption habits, such as shown in step 310. This monitoring can be with respect to the user's consumption of the customized channel, or it can be broader and encompass user's actual consumption of media outside of the customized channel, or even before the customized channel is assembled.

For example, the disclosed embodiments can observe that the user regularly watches the 5 o'clock news at 5 PM on Mondays and Wednesdays, 6 PM on Tuesdays and Thursdays, at 4 PM on Friday, and not at all on Saturdays and Sundays. Alternatively, or additionally, the disclosed embodiments can observe that the user regularly watches particular sport(s), or particular team(s), or that the user frequently listens to particular type(s) of music. These actual consumption habits may be used to presume or refine the user's preferences, which may be used to construct the customized channel.

The aggregator 202 of the disclosed embodiments may also gather information related to the user's data plan. More specifically, while the disclosed embodiments are useful for a variety of the scenarios, one envisioned scenario is the consumption of media content through a wireless, or other, device that may be subject to a data plan having limits.

These data plan limits may vary, depending on how the user's devices are getting their data. For example, the aggregator 202 may learn that the user's TV 204A is never subject to data limits, when communicating with the aggregator 202 through the STB 208 and the cable or satellite network, but may be subject to a data limit, or speed limit, when communicating with the aggregator 202 through the local network hardware 210. Similarly, the user's smartphone 204D may not be subject to data limits when communicating with the aggregator 202 through the local network hardware 210, but is subject to a data limit, or speed limit, when communicating with the aggregator 202 through the cellular network 206C. The disclosed embodiments may take such limits into account, when preparing and presenting a customized channel. For example, the disclosed embodiments may present the customized channel(s) 100/100A at a higher bit rate where there is no data limit, or the user has not approached the data limit. Alternatively, the disclosed embodiments may present the customized channel(s) 100/100A at a lower bit rate where there is a data limit, or the users are approaching the data limit.

Thus, the user preferences may also indicate how the user prefers to consume the media content, accounting for their data plan and data utilization. For example, the user may prefer to watch sporting events at the highest quality/resolution available, even though doing so uses data, from their data plan. The same user may be comfortable watching the news at a lower quality/resolution, thereby conserving data utilization from their data plan. Of course, such preferences may be overridden where the users are approaching the data limit. For example, even though a user may prefer to watch sporting events at the highest quality/resolution available, the system of the disclosed embodiments may reduce the bit rate to avoid exceeding the data limit of the user's plan, if the user views their channel 100 using their phone 204D on the cellular network 206C.

It should be understood that higher quality/resolution media, whether it be video or audio, typically uses a higher bit rate, than lower quality/resolution. A higher bit rate, in turn, uses more data to transmit and receive. Many data plans include unlimited data, in which case data utilization is less of a concern. However, many data plans have limits and/or costs associated with data utilization. Thus, the disclosed embodiments may account for a user's data plan and data utilization when preparing and/or presenting a customized channel.

Thus, these user preferences, related to data utilization, may change during their data plan period. For example, should the user's data utilization near the end of a period be close to a limit for their data plan, they may then prefer to watch a sporting event at a lower resolution, in order to avoid exceeding the limits in their data plan, and incurring overage fees. Alternatively, near the end of the period, with a surplus of pre-paid and unused data available, the user may prefer to watch the news at a higher resolution, thereby utilizing portions of their data allotment that would otherwise go unused. Such inclinations may be provided as part of the aforementioned user preferences or obtained as other user information, as shown in step 302, or may be presumed and automatically instituted by the disclosed embodiments.

Armed with the above described user information, the aggregator 202 looks through the media content available from the sources 102-108 that may be of interest to the user, as shown in step 304. As discussed above, the aggregator 202 may select from a variety of prerecorded media content and/or upcoming live content. The aggregator then prepares a channel, customized for the user, or users, as shown in step 306.

For example, referring also to FIG. 1, the aggregator 202 may schedule Program A1, which may be for example the 5 O'clock news from ABC, at 5 PM on Mondays and Wednesdays. The aggregator 202 may schedule Program B1, which may be for example the 5 O'clock news from NBC, at 6 PM on Mondays and Wednesdays. The aggregator 202 may schedule Program C4, which may be for example an episode one of the user's favorite series available on Hulu, at 7 PM on Mondays and Wednesdays, with a different episode on each night. The aggregator 202 may schedule Program B3, which may be another program from NBC, at 8 PM on Mondays and Wednesdays. In this manner, the aggregator 202 may schedule media content on a channel customized for the user by arranging the media content based on the user preferences and other information about the user.

Also referring to FIG. 1, the aggregator 202 may schedule the channel 100 differently depending on the user and/or time or day, or day of the week, thereby creating a separate channel 100A, or different period of the channel 100. For example, rather than scheduling Program A1 at 5 PM, the aggregator 202 may schedule Program A2, which may be recorded on the local DVR 108 from earlier in the day, or a previous day, at 5 PM on Tuesdays and Thursdays. The aggregator 202 may again schedule Program B1, which may be for example the 5 O'clock news from NBC, at 6 PM on Tuesdays and Thursdays. Rather than scheduling Program C4 at 7 PM, the aggregator 202 may schedule Program C3, which may be recorded on the local DVR 108 from a different source, at 7 PM on Tuesdays and Thursdays. This may allow the aggregator 202 to schedule Program C4 at 8 PM on Tuesdays and Thursdays, thereby presenting the same program as would be presented on Mondays and Wednesdays, but at a different time on Tuesdays and Thursdays.

In this manner, the schedules the channel(s) 100/100A for the user, or users, according to their preferences and other information about the users. For example, channel 100 may be prepared for a first user, with channel 100A being prepared for a second, different user. It should be understood that the disclosed embodiments are not limited to preparing any limited number of channels for any limited number of users. In any case, the channel(s) 100/100A prepared/scheduled for the user(s) may change with the time or day, or day of the week, and may evolve over time and the user's preferences and/or actual viewing habits change.

The aggregator 202 makes the channel(s) 100/100A available to the user(s), as shown in step 308, and monitors the user's, or users', consumption, as shown in step 310. More specifically, the aggregator 202 preferably makes the channel(s) 100/100A available to the user(s) whether they are actively viewing the customized channel(s) 100/100A or not. This allows the user(s)' experience to mimic traditional television, or radio, broadcasting, such that they can tune in, at any time, at any point in a program currently being presented, with one difference being that the channel 100 was assembled/scheduled just for them, such that they are much more likely to enjoy whatever is currently being presented in their channel 100. In one or more embodiments, there is no start-up delay. In one or more embodiments, there is no requirement for the user to choose from recommendations, in order to begin enjoying the media content scheduled on their channel(s) 100/100A.

When the aggregator 202 notices that the user(s) begin watching the programs(s) on their customized channel(s) 100/100A, the aggregator 202 may present the user(s) with an option of starting the current program from the beginning, or continuing from that point on. When the aggregator 202 notices that the user(s) begin watching the programs(s) on their customized channel(s) 100/100A, the aggregator 202 may present the user(s) with an option of switching to another, shorter program such that the channel(s) 100/100 can pick up again at the next break between programs. Of course, none of this is strictly required, as the disclosed embodiments do not require the user to choose from such recommendations or options.

The aggregator 202 may notice that the user has watched several episodes of a series and incorporate upcoming episodes of that series into the customized channel. The aggregator 202 may also notice that the user has not watched one or more programs it has scheduled in the customized channel(s) 100/100A for that user and remove the program from the customized channel(s) 100/100A in the future. In this manner, the information about the user and/or the user preferences may be refined and/or learned, as depicted with the arrow between steps 310 and 302.

As discussed above, the disclosed embodiments may be used with multiple users. Thus, the aggregator 202 may determine that a first user has watched several episodes of a series and incorporate upcoming episodes of that series into the customized channel 100A for a second user. This may be especially useful where both the first and second users share characteristics, such as living in the same or nearby houses, are similar demographically, or share other similarities. In this manner, the disclosed embodiments can learn from one user and share that information with other users who may enjoy the same media content. This information, such as actual consumption information, may also be shared with the sources 102-108, which may incentivize them to make their content available, as depicted by the arrow between step 304 and step 304.

As discussed above, the disclosed embodiments may make the customized channel(s) 100/100A available to the user(s) at a quality level, or bit rate, that varies according to the user(s)' data plan, how the user(s)' devices are connected to the system, and the user(s)' data utilization over a given period of the data plan. For example, should the user be receiving the customized channel 100 with their phone 204D through an Internet 206B connection, then the user(s)' data plan may not apply, resulting in all portions of the channel 100 being presented at the highest bit rate available.

However, even the user's home Internet connection might be subject to a data plan, or other restriction, such as data usage or speed, in which case the channel 100 would be presented at the highest bit rate available, while ensuring compliance with the plan or restrictions according to the user preferences. For example, the user's home Internet connection might be throttled, i.e. speed limited, after a data limit is exceeded. Thus, if the data limit has been exceeded, the channel 100 would be presented at the highest bit rate available, fitting within the speed limit. However, should the user's data usage be approaching the data limit for a given period, then the channel 100 may be presented at the highest bit rate available, or at a lower bit rate to avoid exceeding the data limit. Of course, should the user's current data usage be well below the data limit for a given period, the channel 100 would be presented at the highest bit rate available, optionally according to the user preferences discussed above.

If the user be receiving the customized channel 100 with their phone 204D through an Internet connection, over a cellular network, then a user data plan may apply. In such a case, the channel 100 would be presented at a bit rate that varies according the data plan, the user(s)' data utilization over a given period, and/or the user's preferences, as discussed above. For example, if the user(s)' data utilization is close to the limit of the user(s)' data plan, for a given period, then the channel 100 may be presented at lower bit rate, according to the user preferences. More specifically, even where a user prefers to watch sporting events at a higher resolution, a particular sporting event may be presented at a lower bit rate if the user(s)' data utilization is close to the limit of the user(s)' data plan, for a given period.

As discussed above, more than one user may share the same data plan, and therefore be subject to shared restrictions, and/or one or more channels. So, the customized channel(s) 100/100A may be presented to the user(s) at a quality level, or bit rate, that varies according to the users' shared data plan, the users' cumulative data utilization over a given period of the data plan, and how the users' devices are connected to the system. For example, if a second user's data utilization would put the users' cumulative data utilization close to the limit of the users' data plan, for a given period, then the channel 100 may be presented to the first user at lower bit rate, even where the first user prefers to watch sporting events at a higher resolution.

Thus, the system accounts for the second user's data utilization in presenting first user's channel 100. More specifically, the system may account for the second user's data utilization in presenting the first user's channel 100, whether the second user's data utilization is related to the first user's channel 100, related to a separate channel 100A, or is unrelated to the customized channel(s) 100/100A. Furthermore, the system may account for the second user's data utilization in presenting the first user's channel 100, whether the second user's data utilization is done through the same device 204 as the first user, or a different device 204. In fact, where applicable, the system may account for the both user's data utilization in presenting any of the customized channel(s) 100/100A.

Of course, should the user wish to avoid receiving the customized channel(s) 100/100A at a lower bit rate due to data utilization, for example, they may switch to another device 204 or connection 206, thereby avoiding data plan restrictions.

Different portions of the media content may be presented at different resolutions. Such differences may also be based on user preferences, and data utilization. For example, should the user's data utilization near the end of a period be close to a limit for their data plan, then only the last two minutes of a sporting even may be presented at a higher resolution (with the rest of the even being presented at a lower resolution), in order to avoid exceeding the limits in their data plan, and incurring overage fees.

Additional factors may be used to determine the resolution, quality, or bit rate at which the media content is presented. For example, network traffic conditions, device capabilities, and/or type of content, may be used to determine the bit rate at which the media content is presented. Specifically, should the user be viewing their channel on their smartphone, the media content would not be presented in a resolution that exceeds the capabilities of the smartphone. The user's consumption of similar content may also be used to determine the quality at which the media content is presented. For example, should the user have watched all previous episodes of a particular series, later episodes may be presented at a higher resolution.

Figure 4:
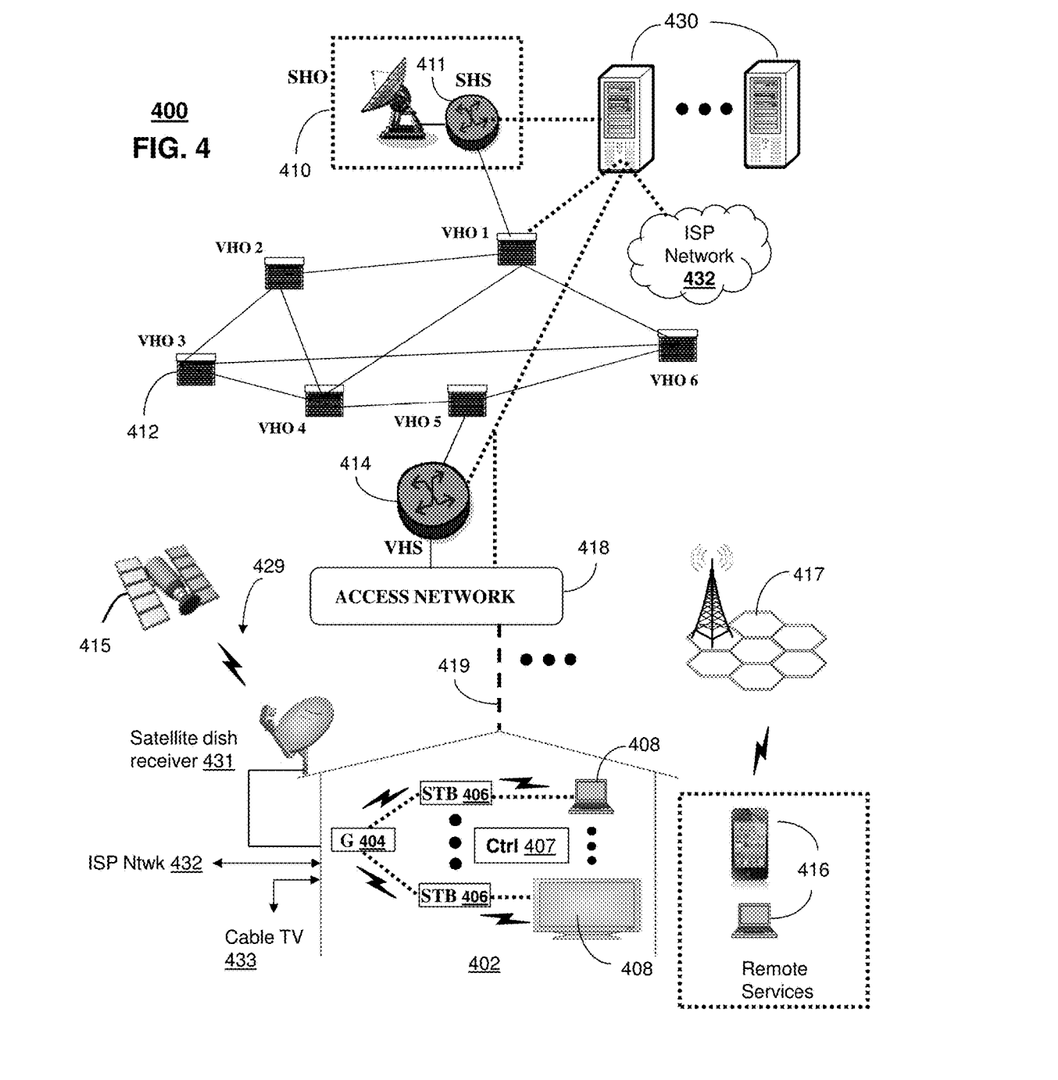
FIGS. 4-5 depict illustrative embodiments of communication systems that provide media services, such as those described in connection with FIGS. 1-3.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with refer to system 200 of FIG. 2 as another representative embodiment of communication system 400. For instance, one or more devices illustrated in the communication system 400 of FIG. 4 may include a processor and a memory that stores executable instructions that, when executed by the processor, facilitate obtaining user preferences of a first user; obtaining data plan information applicable to a first device utilized by the first user; obtaining access to media content from a plurality of sources; scheduling the media content on a first channel customized for the first user, by arranging the media content based on the user preferences of the first user; and providing the first channel to the first device at a first bit rate that varies according to the data plan information.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/ or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as an aggregator 202 or source, 102-108, as described above (herein referred to as processing system 430). The processing system 430 can use computing and communication technology to perform some or all of the functions described above, which can include among other things, the method of FIG. 3. The media processors 406 and wireless communication devices 416 can used as the devices 204 and STB 208, respectively, to utilize the services of processing system 430.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
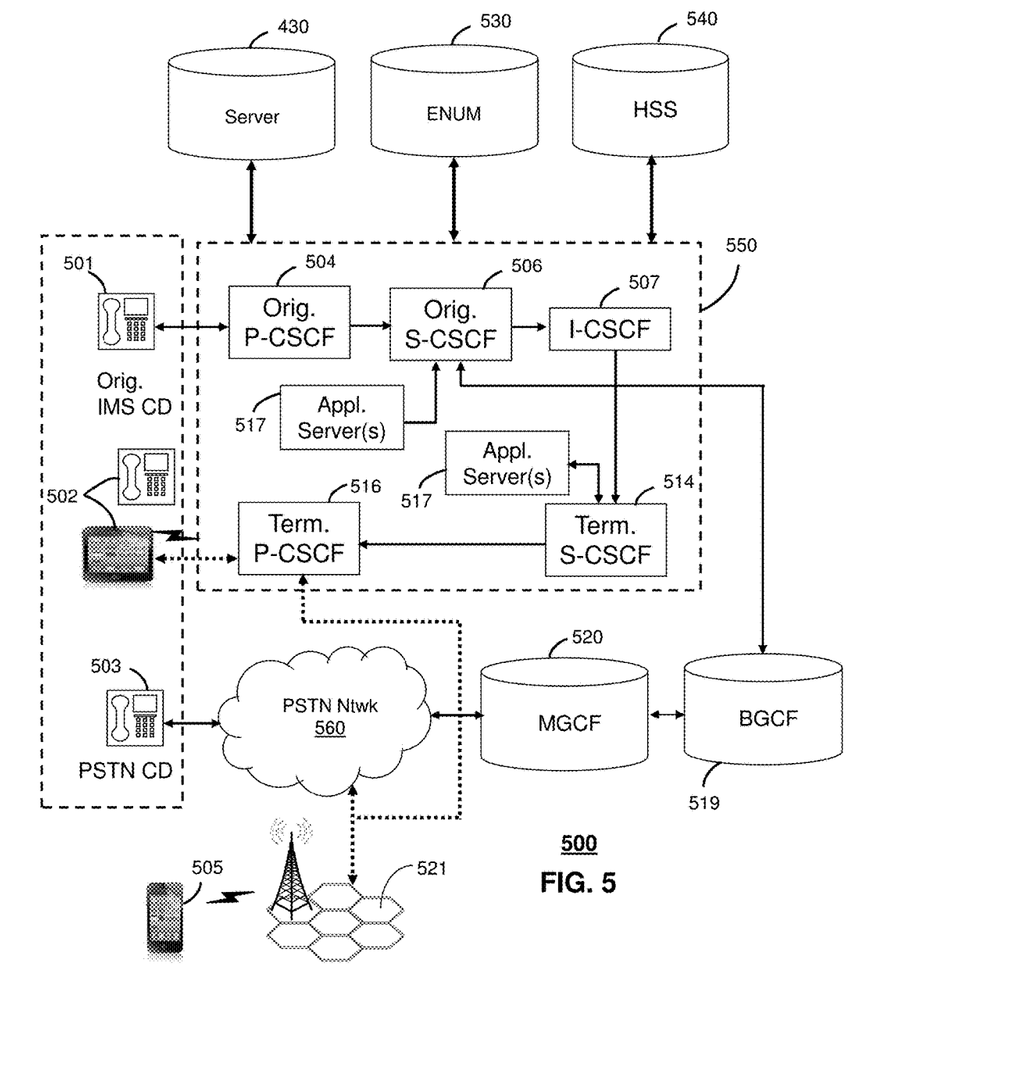

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with environment 200 of FIG. 2 and communication system 400 as another representative embodiment of communication system 400.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The processing system 430 of FIG. 4 can be operably coupled to communication system 500 for purposes similar to those described above. CDs 501, 502, 503 and 505, which can be adapted with software to function as the devices 204 described above to utilize the services of the processing system 430. Processing system 430 can be an integral part of the application server(s) 517 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3$^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
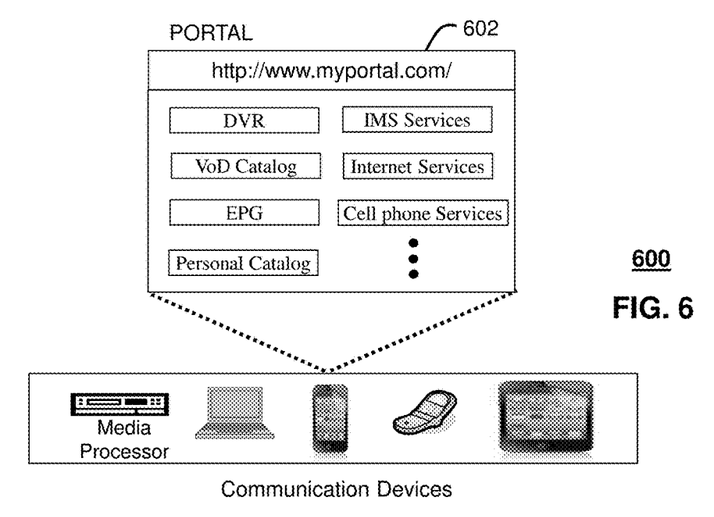
FIG. 6 depicts an illustrative embodiment of a web portal for interacting with the communication systems of FIGS. 2 and 4-5.

FIG. 6 depicts an illustrative embodiment of a web portal 602 of a communication system 600. Communication system 600 can be overlaid or operably coupled with the environment 200 of FIG. 2, communication system 400, and/or communication system 500 as another representative embodiment of the environment 200 of FIG. 2, communication system 400, and/or communication system 500. The web portal 602 can be used for managing services of the environment 200 of FIG. 2 and communication systems 400-500. A web page of the web portal 602 can be accessed by a Uniform Resource Locator (URL) with an Internet browser using an Internet-capable communication device such as those described in FIG. 2 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications Y to adapt these applications as may be desired by subscribers and/or service providers of the environment 200 of FIG. 2, and communication systems 400-500. For instance, users of the services provided by aggregator 202 or server 430 can log into their on-line accounts and provision the servers 110 or server 430 with user profiles, preferences, and other information, and, provide contact information to server to enable it to communication with devices described in FIGS. 2, 4, and 5, and so on. Service providers can log onto an administrator account to provision, monitor and/or maintain the environment 200 of FIG. 2 or server 430.

Figure 7:
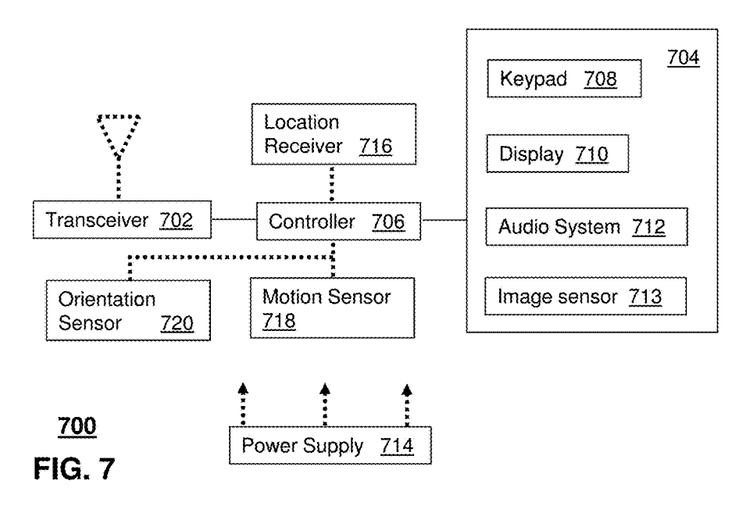
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIG. 2, and FIGS. 4-5 and can be configured to perform portions of the method of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the system 200 of FIG. 2, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in the environment 200 of FIG. 2, communication systems 400-500 of FIGS. 4-5 such as a gaming console and a media player.

Upon reviewing the aforementioned embodiments, it would be evident to an artisan with ordinary skill in the art that said embodiments can be modified, reduced, or enhanced without departing from the scope of the claims described below. For example, the system may impose different bit rate restrictions on each user. For example, the system may force the channel 100/100A to use a lower bit rate, and thus less data, when being viewed by the second user, thereby conversing data utilization for use by the first user, when they view the channel Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
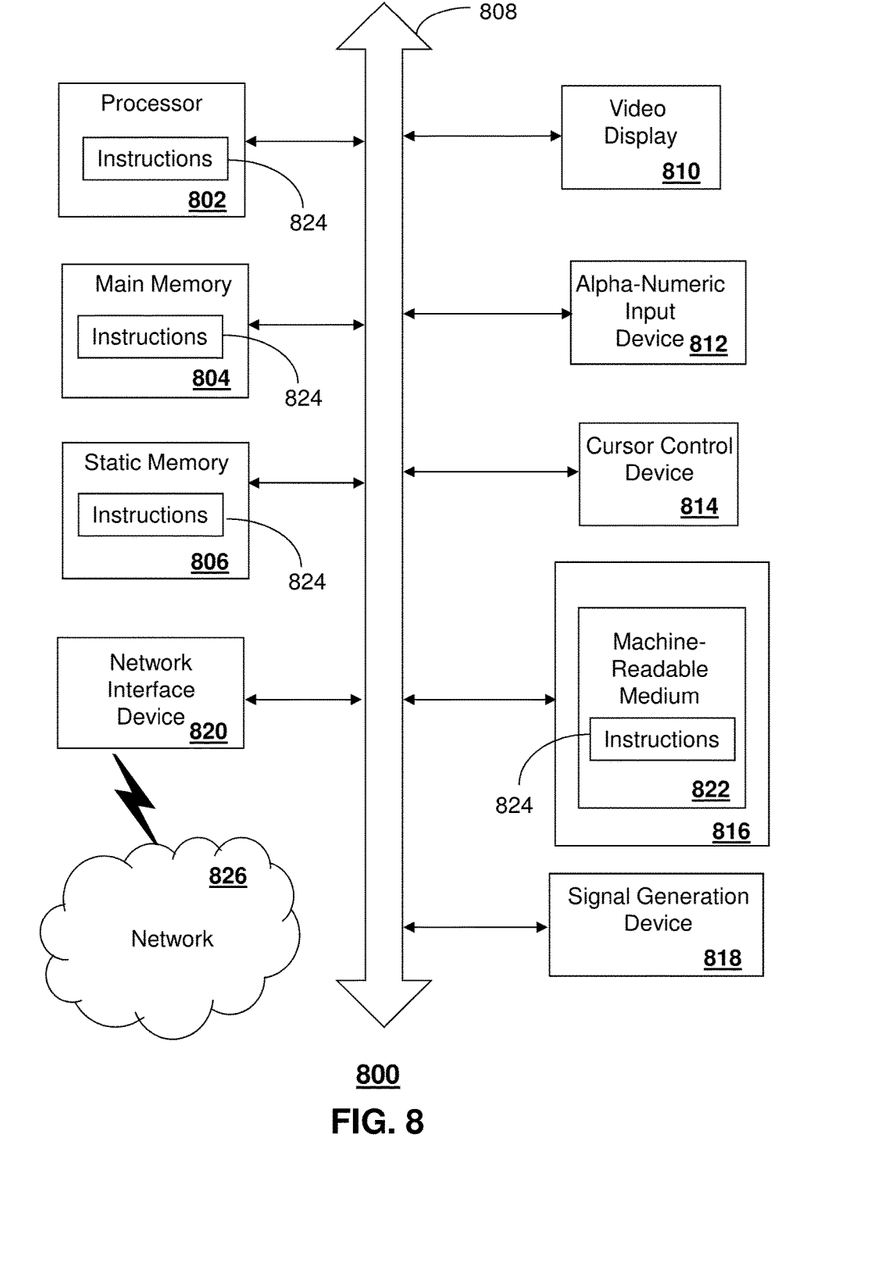
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the system 430, the media processor 406, the aggregator 202, the devices 204, and/or the sources 102-108. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Figure 9:
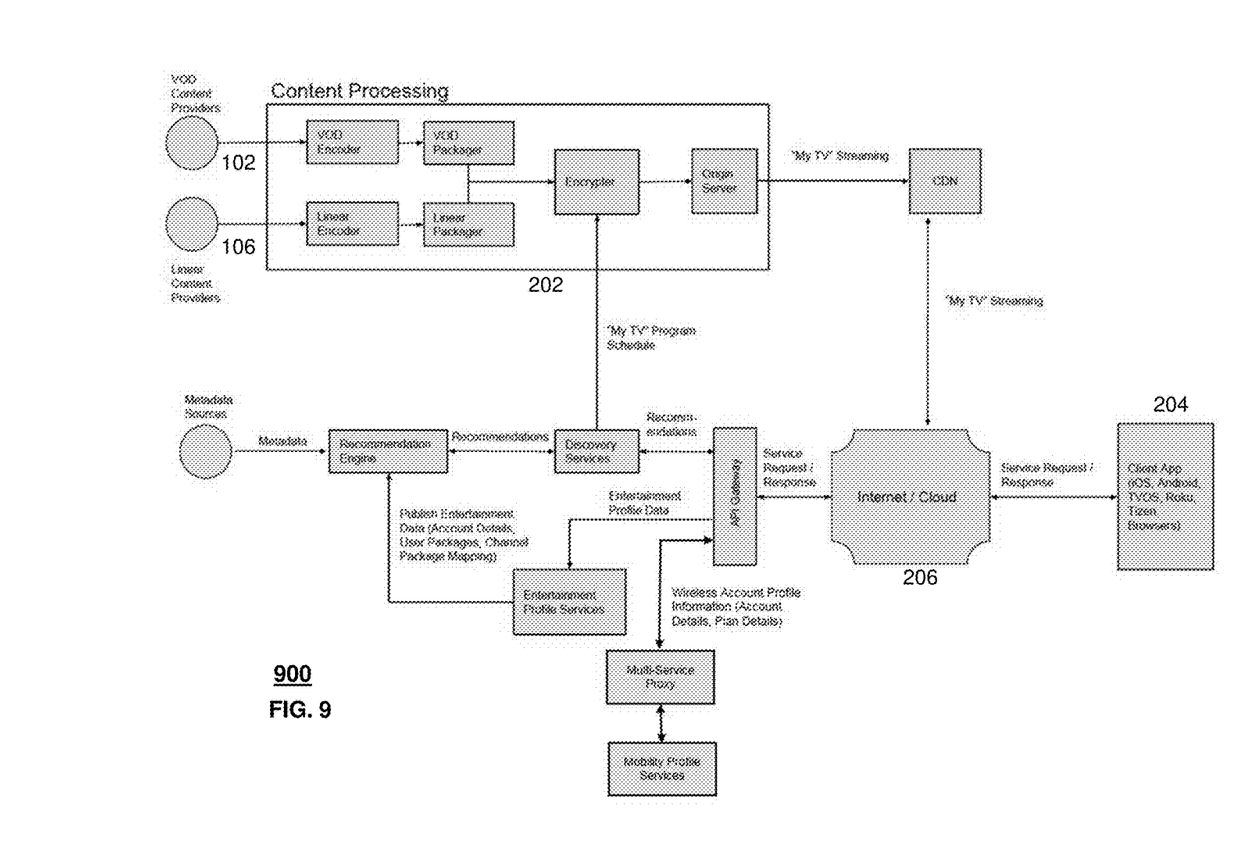
FIG. 9 depicts an illustrative embodiment of a system or environment to support streaming of the customized channel of FIG. 1, which may be used in conjunction with that of FIG. 2.

FIG. 9 depicts an illustrative embodiment of an environment 900, in which the disclosed embodiments can operate. In some embodiments, environment 900 depicts additional detail not shown, but present in environment 200 of FIG. 2. In other embodiments, environment 900 coexists with environment 200, and operate together. In still other embodiments, environment 900 is used instead of environment 200. In any case, the description above of environment 200 may be applicable to environment 900 as well. For example, the disclosed embodiments preferably include a content processing system 202, which may include one or more processors and memory for executing instructions. The processing system 202 may connect to one or more user devices 204, such as a television, a computer, a tablet, and/or a mobile smartphone, through one or more networks 206, such as a broadcast network (not shown), an access restricted network (such as a cable or satellite network), an open network (such as the Internet), and/or another network (such as cellular network). The system 202 may also communication with the sources, such as sources 102 and 106, through any combination of these, and/or another network.

As shown in FIG. 9, a recommendation engine may receive metadata from one or more metadata sources. The metadata may come from the content sources 102-108 and may provide information about the media content. The recommendation engine may also receive information about the user, such as user profiles, user preferences, actual user consumption, data plans, and data utilization. The recommendation engine may then make recommendations based on both the metadata and the information about the user, such as the users' viewing history and demographic background.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to:

solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    obtaining, by a processing system including a processor, user preferences of a first user;
    obtaining, by the processing system, data plan information applicable to a first device utilized by the first user;
    obtaining, by the processing system, consumption information of the first user;

scheduling, by the processing system, media content on a first channel customized for the first user, by arranging the media content based on the user preferences of the first user and the consumption information of the first user; and providing, by the processing system, the first device of the first user access to the first channel at a first bit rate based on the data plan information;

wherein the first bit rate is also based on a second actual consumption of a second user, via a second device, of a second channel, wherein the second channel comprises the media content arranged specifically for the second user and wherein the data plan information is also applicable to the second device.

2. The method of claim 1, wherein the first bit rate is also based on a first actual consumption, via the first device, of the first customized channel.

3. The method of claim 1, wherein the first bit rate is also based on a second actual consumption of a second user, via a second device, of the first channel, wherein the data plan information is also applicable to the second device.

4. The method of claim 1, wherein the first bit rate is also based on a second actual consumption, via a second device, of the first channel, wherein the data plan information is also applicable to the second device.

5. The method of claim 1, further comprising updating, by the processing system, the consumption information of the first user based on consumption habits of the first user with respect to the first channel.

6. The method of claim 1, wherein the media content includes both prerecorded media content and live programming.

7. The method of claim 1, further comprising, obtaining, by the processing system, the media content from equipment operated by different entities.

8. The method of claim 7, further comprising providing, by the processing system, the consumption information specific to the first user to the different entities in exchange for the obtaining the media content.

9. The method of claim 1, wherein the media content is scheduled for the first user based on the user preferences of the first user and temporal aspects of the consumption information of the first user.

10. A non-transitory, machine-readable storage medium comprising executable instructions that, when executed by a processing system including a processor, facilitate performance of operations, comprising:

receiving user preferences of a first user;

receiving data plan information applicable to a first device utilized by the first user;

receiving consumption information of the first user;

scheduling media content on a first channel customized for the first user, by arranging the media content based on the user preferences of the first user and the consumption information of the first user; and providing the first channel to the first device at a first bit rate which is determined according to the data plan information;

wherein the first bit rate is also determined according to a second actual consumption of a second user, via a second device, of a second channel, wherein the second channel comprises the media content arranged specifically for the second user and wherein the data plan information is also applicable to the second device.

11. The non-transitory, machine-readable storage medium of claim 10, wherein the first bit rate is also determined according a first actual consumption, via the first device, of the first customized channel.

12. The non-transitory, machine-readable storage medium of claim 10, wherein the first bit rate is also determined according to a second actual consumption of a second user, via a second device, of the first channel, wherein the data plan information is also applicable to the second device.

13. The non-transitory, machine-readable storage medium of claim 10, wherein the first bit rate is also determined according to a second actual consumption, via a second device, of the first channel, wherein the data plan information is also applicable to the second device.

14. A system, comprising:

a processor;

a memory that stores executable instructions that, when executed by the processor, facilitate performance of operations, comprising:

obtaining user preferences of a first user;

obtaining data plan information applicable to a first device utilized by the first user;

obtaining access to media content from a plurality of sources;

scheduling the media content on a first channel customized for the first user, by arranging the media content based on the user preferences of the first user; and providing the first channel to the first device at a first bit rate that varies according to the data plan information;

wherein the first bit rate varies according to a second actual consumption of a second user, via a second device, of a second channel, wherein the second channel comprises the media content arranged specifically for the second user and wherein the data plan information is also applicable to the second device.

15. The system of claim 14, wherein the first bit rate varies according a first actual consumption, via the first device, of the first customized channel.

16. The system of claim 14, wherein the first bit rate varies according to a second actual consumption of a second user, via a second device, of the first channel, wherein the data plan information is also applicable to the second device.

17. The system of claim 14, wherein the first bit rate varies according to a second actual consumption, via a second device, of the first channel, wherein the data plan information is also applicable to the second device.

* * * * *